H. M. BROWN.
MACHINE FOR MAKING BOTTLES.
APPLICATION FILED JAN. 19, 1917. RENEWED NOV. 4, 1918.

1,292,243.

Patented Jan. 21, 1919.
7 SHEETS—SHEET 1.

WITNESS

INVENTOR
Harry M. Brown
BY
ATTORNEYS

H. M. BROWN.
MACHINE FOR MAKING BOTTLES.
APPLICATION FILED JAN. 19, 1917. RENEWED NOV. 4, 1918.

1,292,243.

Patented Jan. 21, 1919.
7 SHEETS—SHEET 5.

WITNESS

INVENTOR.
Harry M. Brown
BY

ATTORNEYS.

UNITED STATES PATENT OFFICE.

HARRY M. BROWN, OF BROOKLYN, NEW YORK, ASSIGNOR TO SPRING STOPPER COMPANY, OF BROOKLYN, NEW YORK, A CORPORATION OF DELAWARE.

MACHINE FOR MAKING BOTTLES.

1,292,243.   Specification of Letters Patent.   Patented Jan. 21, 1919.

Application filed January 19, 1917, Serial No. 143,368. Renewed November 4, 1918. Serial No. 261,157.

*To all whom it may concern:*

Be it known that I, HARRY M. BROWN, a citizen of the United States, residing at Brooklyn, in the county of Kings and State of New York, have invented a new and useful Improvement in Machines for Making Bottles, &c., of which the following is a specification.

This invention relates particularly to machines for making bottles which are provided within the mouth-portion with an internal circumferential groove; and the primary object of the invention is to provide an improved machine which, while having large capacity, is capable of providing the mouth of the bottle with such an internal groove simultaneously with the formation of the neck and mouth-portion of the bottle.

The invention is illustrated, in its preferred embodiment, in the accompanying drawings, in which—

It may be stated here that a machine of the general construction illustrated is known and used for producing a bottle, such machine being unprovided, however, with mechanism for cutting or forming the internal groove of the bottle-mouth. It is the chief object of the present invention to provide such a machine with practicable means for forming the internal groove, without lessening the capacity of the machine.

It may be said, generally, with reference to the machine illustrated, that it comprises a rotatable table equipped with a circumferentially-arranged series of molds; mechanism for intermittently moving the table, or rotating it step-by-step; means for automatically closing the molds and for automatically opening them again after the forming and blowing operations have been performed; means for automatically raising the internal forming device and rotating the same, the rotation of the internal forming device being effected at a certain point, or station, while the mass of glass is forced or held (by air pressure) into the lower portion of the mold; and means for admitting compressed air to the interior of the bottle, to cause the glass to be blown to the form of the mold, this operation being effected at another point or station, after the mouth-portion of the bottle has been formed and the internal forming devices have been lowered, in which action the air passage through the base-plate of the mold is automatically uncovered, so that air can be admitted when the mold arrives at the station provided for such purpose.

Figure 2:
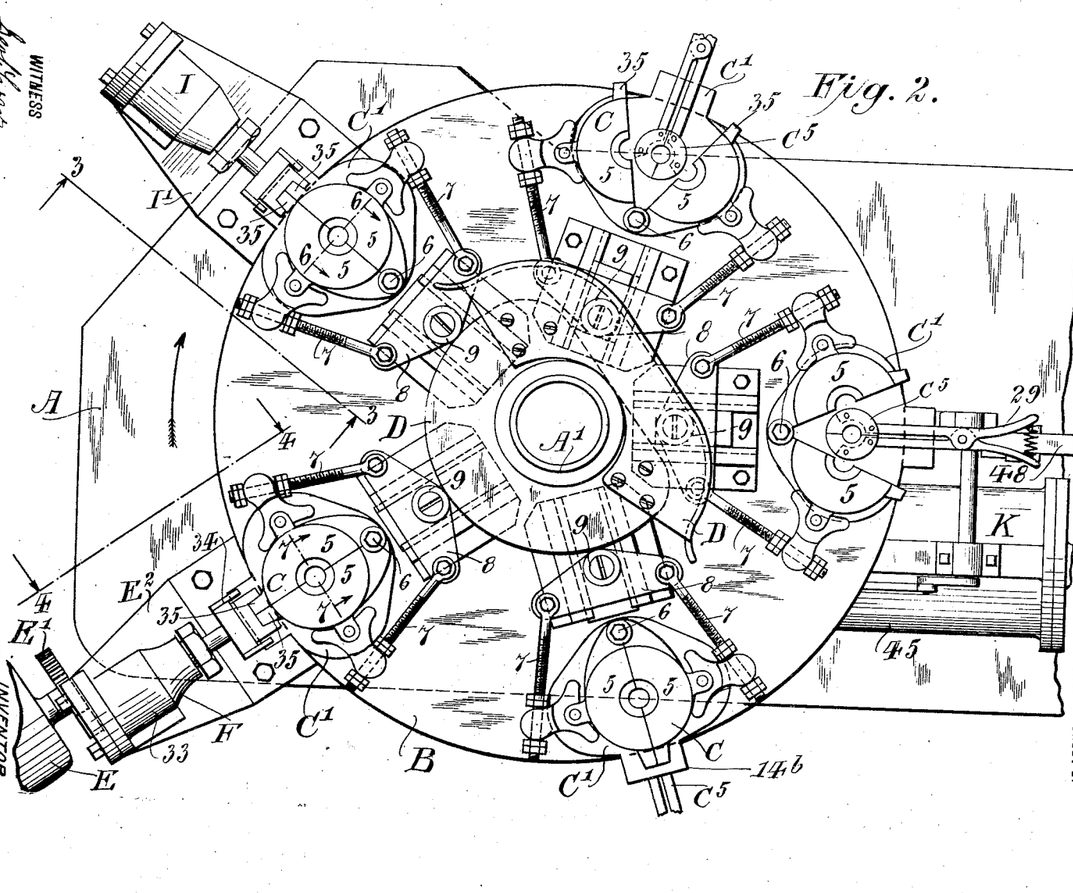
Fig. 2, a broken plan view of the machine.

In the construction illustrated, A represents a base which supports a central column, or standard, A', which is provided with a bearing 1, which may be a ball-bearing, or roller-bearing; B, a rotary table supported by a large sleeve, or hub, B', which is journaled on the standard A', and supported by the bearing 1, the lower portion of said hub being equipped with an integrally-formed disk, or member, 2, which forms a part of the mechanism for actuating the table in a step-by-step movement; C, a circularly-arranged series of molds mounted on the table B; C', a mold base-plate associated with each mold, and which is rigidly secured to the table near its circumferential edge, the swinging sections of the mold being pivotally connected together and mounted on said plate, and also having interlocking connection therewith when the mold-sections are closed; C², a journal-plate associated with each mold and having a hub-portion extending through a perforation in the table B near the circumferential edge thereof; C³, a guide-bar disposed beneath each journal-plate C² and supported by posts 3 depending therefrom; C⁴, an internal forming device journaled in each of the plates C² and the corresponding guide-bar C³, each internal-forming device being equipped with a gear 4, through the medium of which the forming-device is elevated by a stationary cam as the table rotates, is held in the elevated position by a forked lever while the mouth-forming operation is being performed, and is rotated by a motor and a suitable gear-train stationed at the point where the mouth-forming operation is performed; C⁵, a pair of tongs associated with each mold, each pair of tongs serving in effect as a section of the mold, and serving also as a means for removing the container; D a stationary cam-device which is rigidly secured to the stationary standard A' above the table, which cam-device serves to close the molds as they are carried to the point for receiving the charge, and serves again to open the molds after they have passed the stations where the bottle-mouth forming operation and the bottle-blowing operation are performed, respectively; E, a motor provided with a gear-train E', through the medium of which the gears 4 are rotated, in turn, when they reach the station where the mouth-forming operation is performed, said motor and gear-train being mounted on a bracket E² supported on the base A; F, a mold-locking device mounted on the bracket E²; G, a track, or stationary cam, upon which the gears 4 slide, and by which the internal formers are elevated; G', means for supporting, in turn, each gear 4 while the latter is being rotated by the gear-train driven by the motor E; H, a pressure-head, or cap, adapted to be lowered upon the mold when the mold reaches the mouth-forming station, the pressure-head H being actuated by a stem connected with a piston located in a cylinder H', which cylinder is carried by an arm H² fixedly secured to the standard A' some distance above the cam D; I (Figs. 2 and 3), a mold-locking device carried by a bracket I' mounted on the base A; J, (Fig. 3), a pneumatic pressure-device mounted on the bracket I' and adapted to supply air through the base-plate of the mold to the interior of the bottle when the glass-blowing station is reached; and K, mechanism associated with the disk 2 of the sleeve B', and serving to rotate the table B in a step-by-step movement, and lock the table during its period of rest.

The frame, comprising the base A and standard A', is of the usual construction employed in this type of machine. The table B is intermittently advanced and locked by the mechanism K, in the usual manner.

The table B, as is the usual practice, is formed integrally with the hub B'. In the illustration given, the table is equipped with five molds, arranged in a circular series; and the mechanism K is adapted to actuate the table through one-fifth of a revolution at each step, and hold the table locked after each actuation, while the mouth-forming operation is being performed at one point, and the glass-blowing operation is being performed at another point.

Each mold C comprises a pair of vertical mold-sections 5, which are equipped at their rear portions with pivot-lugs, which are connected by pivot-bolts 6. The mold-sections of each mold have connected therewith (Figs. 1 and 2) actuating-rods 7, which are connected with actuating-slides 8, equipped with cam-rollers 9 co-acting with the stationary cam-device D, which operates in the usual manner to open and close the molds. The sections of each mold rest upon the corresponding mold-plate C', the latter being secured (Figs. 3 and 5) to the table B and journal-plates C², by bolts 10. Each mold-plate is provided (Fig. 7) with an upwardly-extending hub-portion, which is equipped with an external flange 11, with which interlock inwardly-projecting flanges 12, with which the mold-sections are provided at their lower portions.

Each journal-plate C² is provided with an upwardly-extending hub-portion 13, which fits in an opening, with which the table B is provided near its circumferential edge, the hub having a reduced extension 13ª, which fits within a corresponding recess, or counter-sink, at the lower portion of the bore 14 of the base-plate C' of the mold. The hub 13 of the journal-plate C' is provided with a bore, which forms an extension of the bore 14. The internal former C⁴ and the hub of the actuating pinion are journaled in the bore mentioned. The upper surface of the hub-portion of the mold base-plate C' is provided with a central recess, or counter-sink 15, adapted to receive the operative portion of the tongs C⁵, which constitutes in effect a section of the mold. The operative portion of the tongs is adapted to rest upon an internal wall, or flange, 16, which projects into or overhangs the upper portion of the bore 14.

The internal former C⁴ comprises a spindle 17, which is provided (Figs. 7 and 8), with an enlargement 17ª, conforming to the bore 14, a tapering portion 17ᵇ, a reduced cylindrical portion 17ᶜ, a still further reduced cylindrical portion 17ᵈ, and a reduced rounded tip-portion 17ᶠ; a pair of groove-forming levers 18 housed in vertical slots with which the enlarged portion of the spindle is provided, and supported on pivots 19, which extend transversely of said slots; the gear 4 mounted on the reduced lower portion of the spindle being connected therewith by a key 20, permitting vertical movement of the gear with relation to the spindle; a sleeve 4ª which is rigidly fitted on the hub of the gear 4, and has an upward projection adapted to abut against the lower wall of the enlargement 17ª of the spindle, the hub of the gear being provided with extensions 4ᵇ (Figs. 7–9) equipped with inclined cam-slots 21, which accomodate cam-studs 18ᵃ, with which the lower ends of the groove-forming levers 18 are equipped; a stop which limits the upward movement of the spindle 17, and which comprises a plug, or cap, 22, which is screwed into the lower end of a bore 23, with which the spindle 17 is provided, the plug 22 being provided with a flange 22ᵃ, adapted to contact with the lower surface of the guide C³, through which the lower end of the spindle 17 extends; and a tension-spring 24 (shown brokenly in Fig. 7) located in the bore 23 and having its lower end connected with a stud 25 secured to the spindle, and having its upper end connected with a transverse pin 26, whose ends are secured to the extensions 4ᵇ of the hub of the gear 4, the pin 26 being movable in a short slot 27, with which the hollow portion of the spindle 17 is provided near the upper end of the bore 23.

Figure 7:
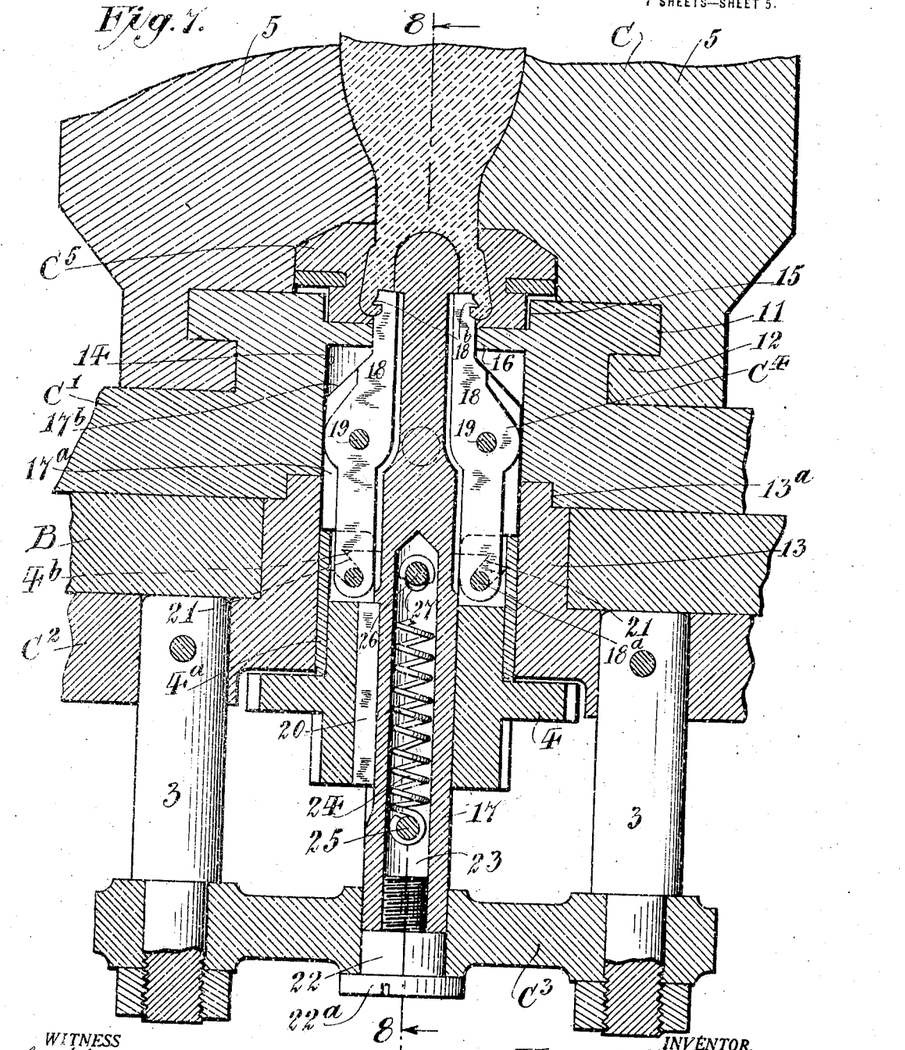
Fig. 7, a similar view, showing the internal forming elements in the elevated position which they occupy when the glass is forced into the mold, and while the mouth-portion of the bottle is being formed.
Figures 8, 9:
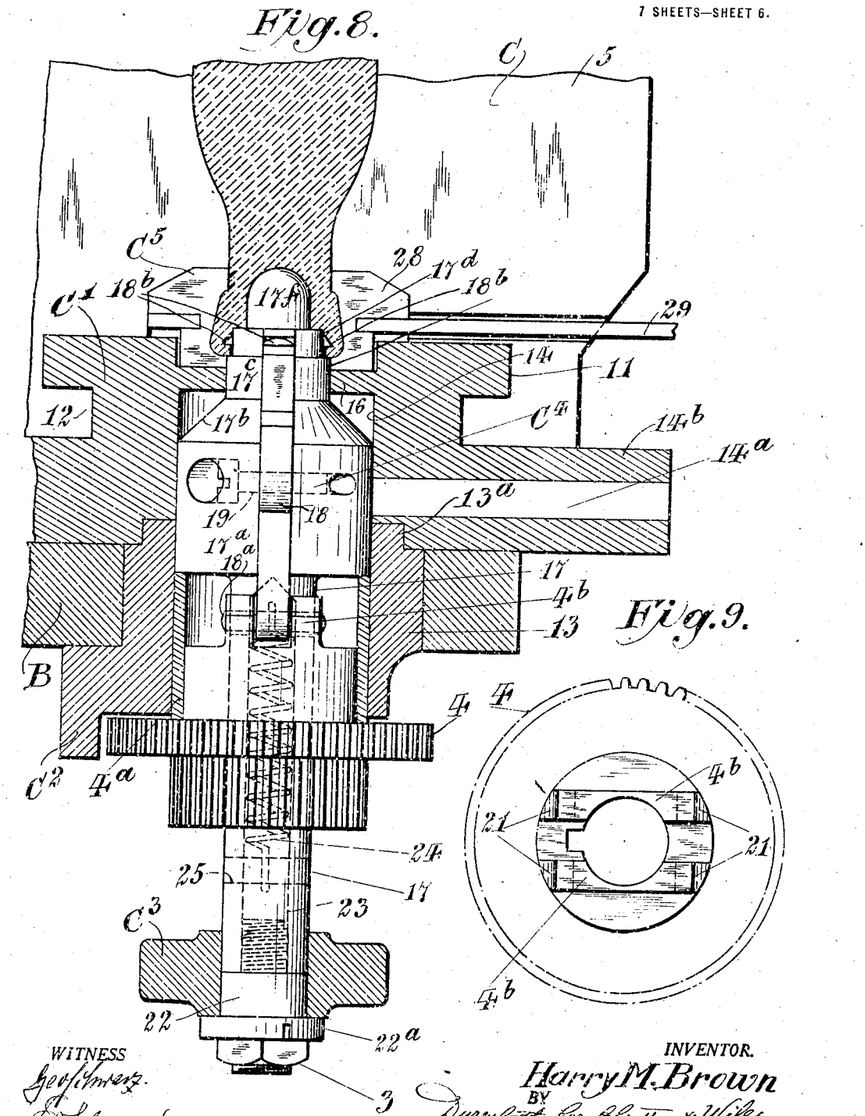
Fig. 8, a broken sectional view, taken as indicated at line 8 of Fig. 7.
Fig. 9, a plan view of the vertically shiftable gear, and rigidly-secured sleeve carried thereby, which serve to rotate the spindle and actuate the groove-cutting levers.

From the description given, it will be understood that when the gear 4 is elevated, the tension-spring supported by the pin 26, which the hub of the gear carries, lifts the spindle 17 until the flange 22ᵃ strikes the lower wall of the guide-member C³; and the further vertical movement of the gear causes the cam-slots 21 to actuate the levers 18 through the medium of the cam-studs 18ᵃ; thus throwing the upper ends of the levers 18 outwardly, so that the groove-cutting projections, or bits, 18ᵇ, will be in the projected position. When the gear 4 is lowered again, the tension of the spring remains sufficient to hold the spindle 17 elevated, while the cam-slots 21 separate the lower ends of the levers 18, thereby retracting the bit-portions 18ᵇ, so that the whole spindle is then free to move downwardly as the gear 4 continues its descent.

Each mold-plate C' is provided with an air-passage, or conduit, 14ᵃ, which communicates with the bore 14 when the enlargement 17ᵃ of the spindle 17 drops below said passage. The passage 14ᵃ extends outwardly through a projection 14ᵇ, the end of which is adapted to register with the air-charging device J, which is located at the bottle-blowing station.

Figure 10:
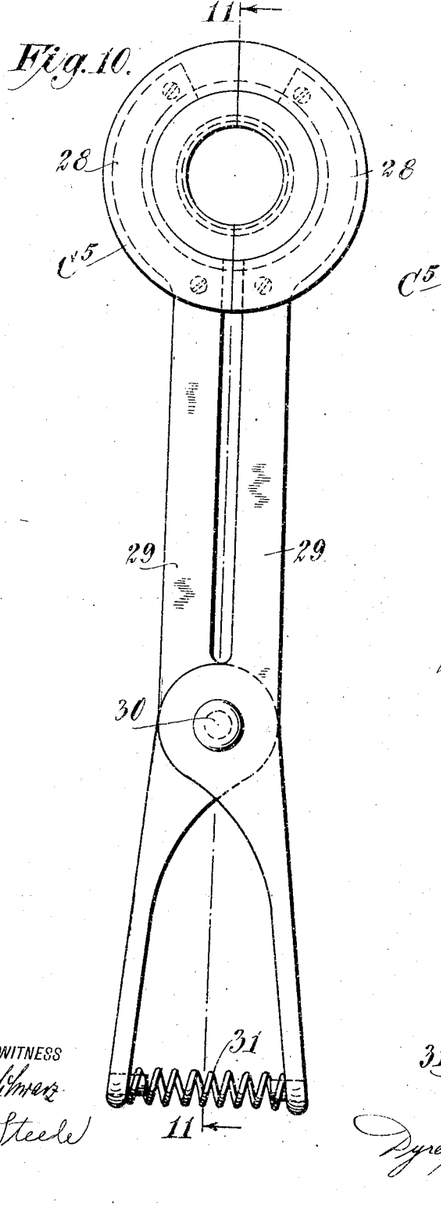
Fig. 10, a plan view of the tongs employed in connection with each mold.
Figure 11:
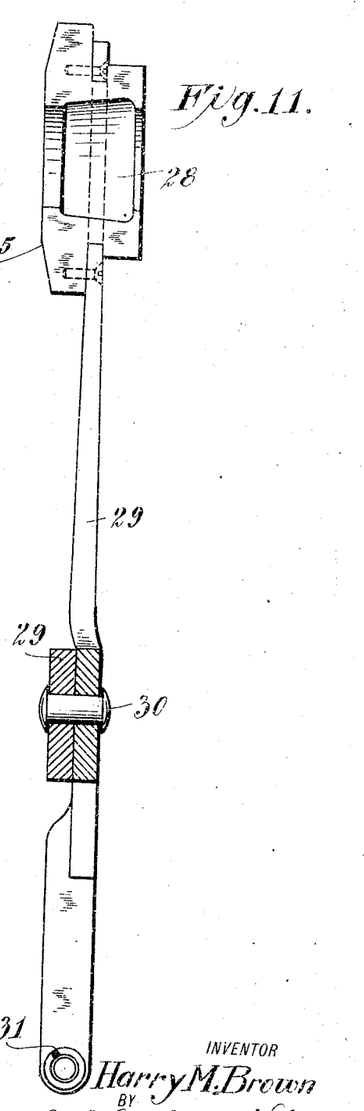
Fig. 11, a sectional view of the same, taken as indicated at line 11 of Fig. 10.

The tongs C⁵, as shown in Figs. 10 and 11, comprise two bottle-head forming sections 28, carried by levers 29, which are connected by a pivot 30, and which have their handles held normally in separated position by a spring 31, which thus serves to hold the sections 28 in closed position. It will be noted that the tong-heads, or sections, 28, are given an internal configuration, corresponding with the external configuration of the bottle-head and lip of the bottle-mouth. The operative portions of the groove-forming levers 18 are shaped to conform to the lip of the bottle and to cut the internal groove in the bottle-mouth.

The cam-device D is of the usual character employed in a machine of this general type, and serves to project and retract the slides 8, and thus open and close the molds automatically as the table rotates.

Figures 3, 4, 5:
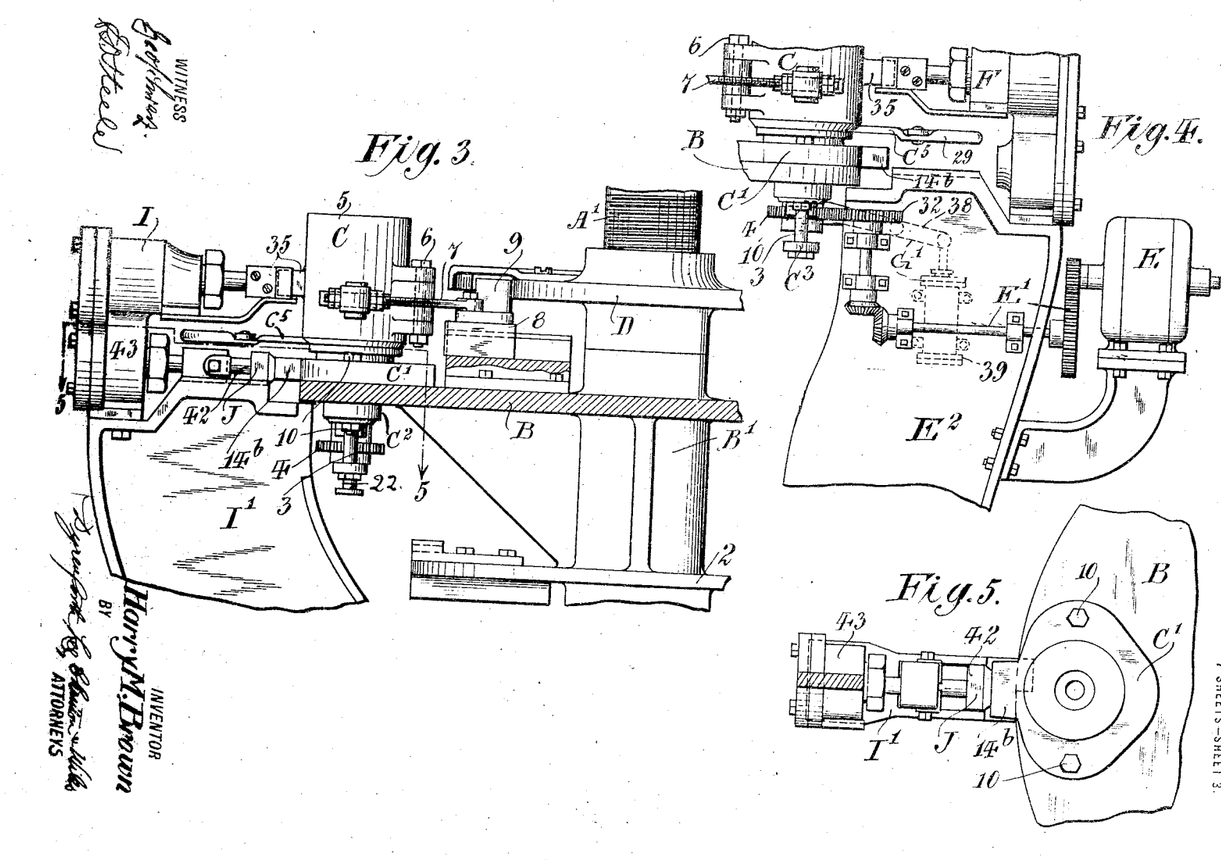
Fig. 3, a broken vertical sectional view, taken as indicated at line 3 of Fig. 2.
Fig. 4, a broken sectional view, taken as indicated at line 4 of Fig. 2.
Fig. 5, a broken plan section, taken as indicated at line 5 of Fig. 3.

The motor E may comprise an electric motor; and the gear-train E' may be of any suitable arrangement, the arrangement shown being clearly disclosed in Fig. 4. Thus, the gear-train is provided with a gear 32, which is adapted to mesh with and actuate each gear 4, as such gear is brought by the table to the appropriate position, at which time the gear 4 is at the same level as the gear 32.

The mold-locking device F comprises a cylinder 33 fitted with a double-acting piston which carries the locking member 34, which is adapted to engage radially-projecting lugs 35, with which the mold-sections are provided.

Figure 1:
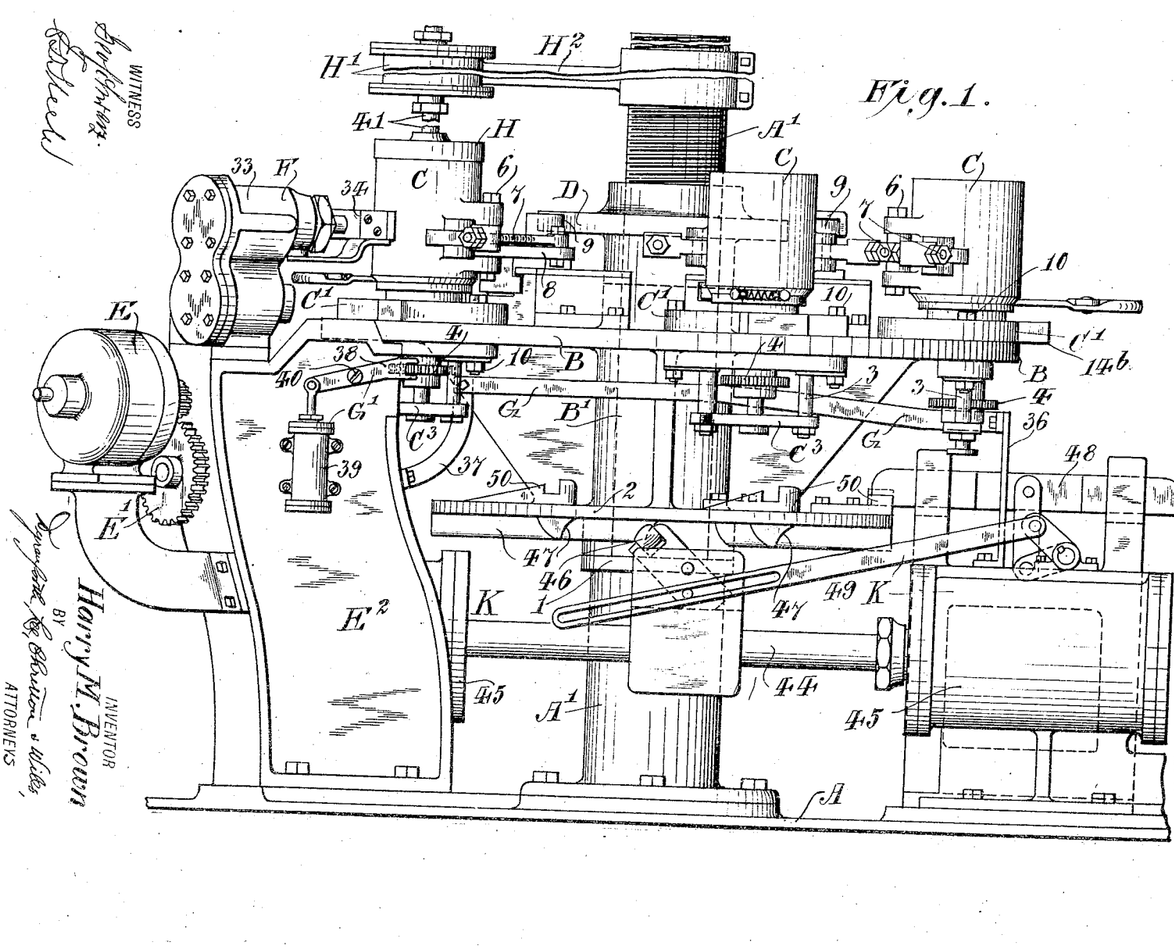
Figure 1 represents a broken elevational view of a machine constructed in accordance with the invention.

The stationary cam, or track, G, is of such form as to enable the gears 4 to ride thereon as they are carried in their orbital path by the rotation of the table B. Said track is supported by brackets 36 and 37, as shown in Fig. 1. The device G' comprises a forked lever 38 adapted to engage the gear 4 (see Fig. 1), and a cylinder 39 fitted with a double-acting piston, which serves to actuate the lever G' about the pivot 40, which is supported by the bracket E². The forked end of the lever is raised to receive the gear 4 as it rides off the cam G, and is lowered at the appropriate time to allow the internal former to descend after the mouth-forming operation has been performed.

The pneumatic pressure-head H is adapted to be raised and lowered by a double-acting piston, with which the cylinder H' is fitted; and air may be admitted through the pressure-head, or in any desired manner, to the upper portion of the mold. The pressure-head H also fits over the sections of the die C, thus aiding in locking the sections together. Air-pressure in the upper portion of the mold forces the mass of glass into the lower portion of the mold, as indicated in Fig. 7, thus enabling the head and mouth of the bottle to be formed. Afterward, the internal former descends, uncovering the air passage or port 14ᵇ, so that air will be admitted to the interior of the bottle, or container, when the mold arrives at the station shown in Fig. 3, where the blowing operation is performed.

The mold-lock I is of the same character as the mold-lock F, and operates in the same manner. It may be remarked that the mold is held in the closed position by the cam-device D, but is additionally locked when the mold is at the station where the work is being performed.

Figure 6:
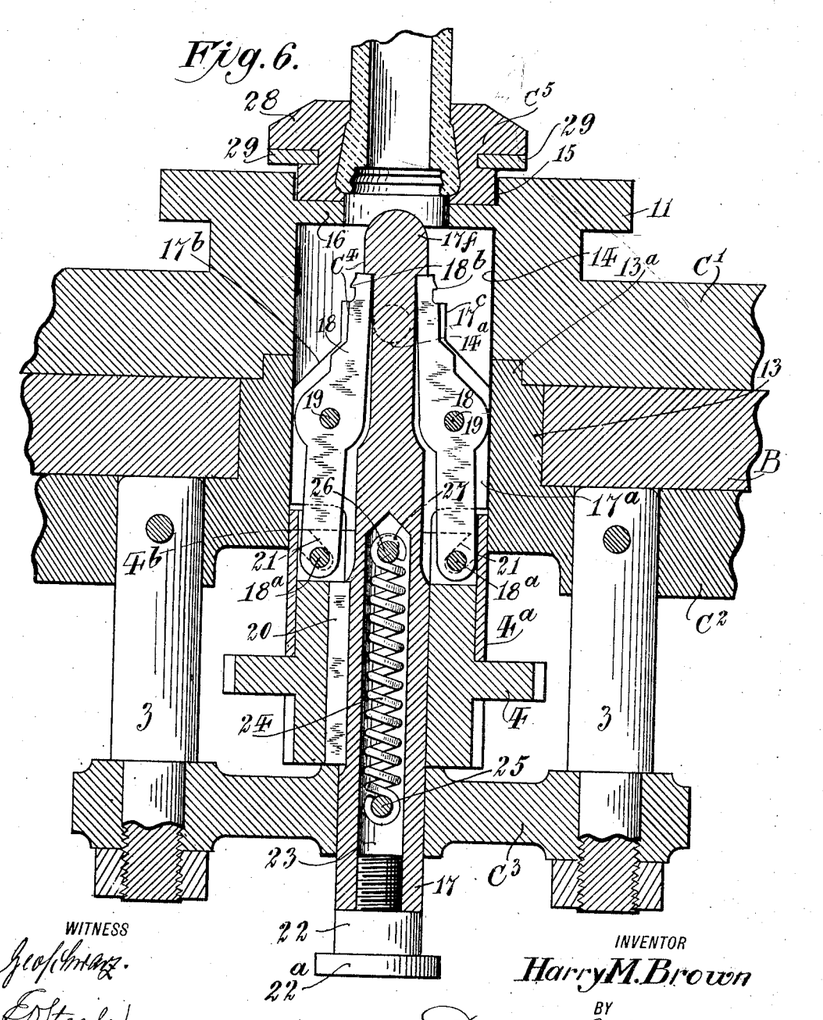
Fig. 6, an enlarged broken vertical sectional view, taken as indicated at line 6 of Fig. 2.

The air-pressure, or blowing device, J, comprises a hollow head 42, carried by a tubular stem, through which air is admitted, and a cylinder 43 fitted with a double-acting piston, which serves to actuate the head 42. When the mold arrives at the position shown in Fig. 3, the head 42 moves inwardly and registers with the extremity of the projection 14$^b$ of the mold base-plate C', thus bringing the port 14$^a$ into registration with the air-pressure device, so that air will be admitted to the interior of the container, it being understood that the enlargement 17$^a$ of the spindle 17 has, in the meantime, dropped from the position shown in Fig. 8 to the position shown in Fig. 6, thus bringing the beveled portion 17$^b$ of the spindle below said port. The usual pressure-head or cap (not shown) which descends upon the mold at the station I may be employed.

The mechanism K, which actuates and locks the table B, is of well-known construction, and need not be described in detail. It may be remarked, however, that it includes a piston-rod 44 actuated by pistons mounted in cylinders 45, and equipped with an actuating member 46 adapted to engage cams 47, with which the disk 2 is equipped at its lower side; also a locking device 48 actuated by a member 49, and serving to engage, in turn, locking members 50, with which the disk 2 is equipped on its upper surface. The usual means (not shown) for setting the machine in operation may be provided.

The operation may be described briefly: The table B is rotated in a step-by-step movement through the medium of the mechanism K acting upon the disk 2, with which the hub B' is equipped. Thus, the molds C are carried in an annular path, and are automatically opened and closed at the appropriate times. After the removal of the bottles, the tongs C$^5$ are placed back in the machine at the point or station designated L in Fig. 2. The mold-sections automatically close upon the tongs as the table rotates. The glass is placed in the mold at or near the station designated M in Fig. 2, or at any rate the glass is placed in the mold preparatory to lowering the pressure-head H upon the mold. As the mold approaches the point where the glass is introduced, the internal former is automatically lifted by the cam G, upon which the gear 4 rides. When the mold reaches the station where the mouth-forming operation is to be performed, the pressure-head H descends upon the mold, and the device F operates to lock the mold-sections together. The pressure of the air below the head H forces the mass of glass into the lower portion of the mold and about the internal former. At the proper instant, the gear 4 comes within the range of the supporting lever 38 of the device G', and also comes into mesh with the gear 32 of the gear-train E', so that the internal former will be rotated by the motor E. In this manner, the head and mouth-portion of the bottle are formed, the internal groove in the bottle-mouth being cut by the bits 18$^b$ of the groove-cutting levers 18. After this operation, the internal former is lowered, while the mold is being carried to the next station. In the first portion of the descent of the gear 4, the cam-slots 21 operate to separate the lower ends of the levers 18, thereby retracting the bits of the levers, so that they will be free from engagement with the flange at the lip of the bottle; and in the further descent of the gear, the spindle descends, carrying with it the levers 18. When the spindle is in its lowermost position, the port 14$^a$ is uncovered.

When the mold reaches the station where the blowing operation is to be performed, the lock I operates to lock the mold-sections, and the pressure-head 2 moves inwardly to contact with the projection 14$^b$ of the mold base-plate, so that pressure will be admitted through the port 14$^a$ to the cavity formed in the glass by the upper portion 17$^f$ of the spindle 17; and thus the bottle will be blown to the form of the mold. In the further operation, the mold is unlocked, and is automatically opened, thus enabling the bottle to be removed by means of the tongs, after which the tongs are inserted in the machine.

If desirable, the bottles may be submitted to further finishing operations in another machine.

The machine of the character described is adapted to produce, rapidly and economically, bottles provided with an interior groove, adapted to receive a stopper or seal of the character illustrated in my Patent No. 1,022,060, granted April 2, 1912.

The foregoing detailed description has been given for clearness of understanding only, and no unnecessary limitation should be understood therefrom, but the appended claims should be construed as broadly as permissible, in view of the prior art.

What I regard as new, and desire to secure by Letters Patent, is:

1. In a machine of the character set forth, the combination of a rotary table, a series of molds mounted thereon, vertically-movable internal formers associated therewith and having portions depending below the table, said formers having their upper portions provided with expansible means for grooving the interior of the container-mouth, supports for said formers at the lower side of said table, means below the plane of said table for raising and lowering said formers, and means for rotating said formers, including gears carried with the formers, and means located at a given station adjacent the path of the molds and serving to engage said gears in turn and rotate the same after said internal formers have been raised to the elevated position.

2. In a machine of the character set forth, the combination of a rotatable table, means for actuating said table, a series of mold base-plates mounted on said table near the periphery thereof, said mold plates being provided with bores, tongs associated with said mold base-plates and provided with sections for forming the head-portion of the container, mold-sections associated with said mold-plates and adapted to inclose the form-sections of the tongs, means for automatically closing and opening the mold-sections as the table rotates, internal formers comprising spindles projecting into said bores and equipped with groove-forming levers, means for automatically elevating said spindles and projecting the operative portions of said levers, and means for rotating said spindles in turn when they arrive at a given station.

3. In a machine of the character set forth, the combination of a rotary table provided near its periphery with a series of vertical openings, a series of mold base-plates mounted on said table and having bores registering with said openings, a series of journal-plates disposed beneath the table and provided with hub-portions projecting into said openings, spindles projecting through said journal-plates, and equipped with movable groove-cutting members and means for actuating the same, gears associated with said spindles, means for elevating said gears and spindles, in turn, means for rotating said gears, in turn, at a given station, and mold-sections carried by said table and adapted to interlock with said mold base-plates.

4. In a machine of the character set forth, a rotary table, a series of mold base-plates mounted thereon, molds associated with said base-plates, spindles adapted to be raised and lowered through said base-plates, groove-forming levers mounted on said spindles, a gear-element mounted on each spindle and movable longitudinally thereon, said gear element equipped with lever-actuating means, means for raising said gear element, and means for rotating said gear elements in turn as they are brought into registration therewith.

5. In a machine of the character set forth, a rotating table, a series of mold-plates mounted thereon, a vertically-movable spindle associated with each base-plate and having a portion projecting below the table, expansible groove-forming means movably mounted on each spindle, means mounted on each spindle and movable longitudinally thereon for projecting said groove-forming means, an actuating element mounted on each spindle below said table and serving to rotate the same, a cam device below said table serving to elevate each spindle and the means associated therewith for projecting said groove-forming means, and local mechanism disposed at a given station and adapted to engage each actuating element in turn after the elevation of the spindles and when the actuating element is brought into engagement with said local mechanism.

6. In a machine of the character set forth, a rotating table, a series of mold-plates mounted thereon, an internal former associated with each mold-plate, comprising a vertically movable spindle equipped with movably mounted expansible groove-cutting means, and means associated with each spindle for projecting the groove-cutting means and rotating the spindle, including a gear element on the spindle below said table adapted to raise the spindle, means for raising and lowering said gear elements, and local means at a given station adapted to rotate each gear element, in turn, after it has been elevated.

7. In a machine of the character set forth, the combination with a rotary table, a series of molds mounted thereon, an internal forming device comprising a spindle, groove-forming levers mounted on said spindle, and a gear-element movable longitudinally on said spindle and having cam connections with said levers.

8. In a machine of the character set forth, a rotary table, a series of molds mounted thereon, an internal former associated with each mold, comprising a vertically movable spindle, groove-forming elements movably mounted on said spindle, a gear element movable longitudinally on said spindle and equipped with means for actuating the groove-forming element, spring connections between the spindle and the gear-element, stop means for limiting the upward movement of the spindle, and means for elevating the gear element, beyond the limit of movement of said spindle.

9. In a machine of the character set forth, a rotary table equipped with a series of molds, a guide-member associated with each mold and disposed beneath the table, a vertically-movable spindle connected with said guide, a groove-cutting lever mounted on said spindle, a gear-element slidable longitudinally on said spindle and equipped with means for actuating said lever, a tension spring disposed in a bore with which said spindle is provided, and having one end connected with said spindle and the other end connected with said gear-element, means for engaging and elevating said gear element, and a stop limiting the upward movement of said spindle.

10. In a machine of the character set forth, a rotary table, a series of mold base-plates mounted thereon, said mold base-plates provided with bores and sockets above said bores, tongs equipped with mold-sections accommodated by said sockets, and internal formers associated with said mold base-plates, each comprising a vertically-movable spindle equipped with a projectable groove-cutting element, and means for elevating each spindle in turn and projecting the groove-cutting element and rotating the spindle, including a gear on each spindle beneath said table, adapted to elevate the spindle and cause the groove-forming element to be projected, and local means disposed at a given station and adapted to rotate said gear element after it has been elevated.

11. In a machine of the character set forth, a rotary table, a series of molds mounted thereon, a series of guides associated with said molds and depending beneath the table, and internal formers, each comprising a vertically-movable spindle having its lower portion received by the corresponding guide, a groove-forming lever mounted on said spindle, a spindle-rotating element vertically slidable on the spindle and equipped with means for actuating the groove-forming element, a spring contained in a bore in said spindle and having one end connected with the spindle-rotating element and the other end connected with the spindle, means for limiting the upward movement of the spindle, and a cam serving to engage and successively elevate the gear-elements and through the medium thereof to raise the spindles and project the groove-forming elements.

12. In a machine of the character set forth, a rotary table, a series of molds mounted thereon, a series of guides associated with said molds and depending beneath the table, and internal formers, each comprising a vertically-movable spindle having its lower portion received by the corresponding guide, a groove-forming lever mounted on said spindle, a spindle-rotating element vertically slidable on the spindle and equipped with means for actuating the groove-forming element, a spring contained in a bore in said spindle and having one end connected with the spindle-rotating element and the other end connected with the spindle, means for limiting the upward movement of the spindle, a cam serving to engage and successively elevate the gear-elements and through the medium thereof to raise the spindles and project the groove-forming elements, and local means adapted to rotate said spindle-rotating elements as they are successively brought into registration therewith.

13. In a machine of the character set forth, a rotating table, a series of mold base-plates mounted thereon, each provided with an air conduit, molds associated with said mold-plates, and internal formers, each comprising a vertically movable spindle having an enlarged portion adapted to serve as a valve for covering and uncovering the port of said conduit, a groove-forming lever mounted thereon, means for elevating the spindle and projecting the groove-forming lever, and mechanism for rotating the spindles, *seriatim*, when they arrive at a given point, including gear elements on said spindles beneath said table.

14. In a machine of the character set forth, a rotary table equipped with a series of molds, an internal former associated with each mold and carried by said table, each internal former comprising a vertically movable, rotatable spindle, a groove-forming member movably mounted thereon, a gear element movably mounted on said spindle and serving to project the groove-forming element, a stationary cam serving to elevate each gear element in turn, and local mechanism adapted to engage and actuate each gear element when it is at the station where the mouth-forming operation is performed.

15. In a machine of the character set forth, a rotary table equipped with a series of molds, an internal former associated with each mold and carried by said table, each internal former comprising a vertically movable, rotatable spindle, a groove-forming member movably mounted thereon, a gear element movably mounted on said spindle and serving to project the groove-forming element, a stationary cam serving to elevate each gear element in turn, local mechanism adapted to engage and actuate each gear element when it is at the station where the mouth-forming operation is performed, a movably-mounted gear-supporting element adapted to engage the gear after it has been elevated by said cam, and means for actuating said gear-supporting element.

HARRY M. BROWN.